United States Patent [19]

Pratt

[11] 4,265,975

[45] May 5, 1981

[54] POLYESTER RESIN COMPOSITION CONTAINING OXY ALUMINUM ACYLATES

[75] Inventor: Charles E. Pratt, Signal Mountain, Tenn.

[73] Assignee: Chattem Inc., Chattanooga, Tenn.

[21] Appl. No.: 65,142

[22] Filed: Aug. 9, 1979

[51] Int. Cl.$^3$ .......................... B29D 7/02; C08K 5/09; C08L 67/06

[52] U.S. Cl. .................................. 428/480; 264/320; 525/15

[58] Field of Search .......................... 525/15; 264/320; 428/480

[56] References Cited

U.S. PATENT DOCUMENTS

| | | |
|---|---|---|
| 2,892,780 | 6/1959 | Rinse .............................. 260/22 T X |
| 3,361,845 | 1/1968 | Watanabe et al. .................. 525/13 X |
| 3,536,642 | 10/1970 | Williger ............................ 525/262 X |
| 4,049,748 | 9/1977 | Bailey . |

FOREIGN PATENT DOCUMENTS

| | | | |
|---|---|---|---|
| 1060590 | 7/1959 | Fed. Rep. of Germany ............. | 525/15 |
| 1164089 | 2/1964 | Fed. Rep. of Germany ............. | 525/15 |
| 49-16792 | 2/1974 | Japan .................................... | 525/15 |
| 1092528 | 11/1967 | United Kingdom . | |

*Primary Examiner*—Allan Lieberman
*Attorney, Agent, or Firm*—Hill, Van Santen, Steadman, Chiara & Simpson

[57] ABSTRACT

A curable storage stable polyester resin composition in a liquid or formable solid form containing oxy aluminum acylate. No water is needed in order to cause the composition to increase in viscosity over the viscosity of a comparable composition which contains no such oxy aluminum acylate, and no by-product alcohol is produced in the system as the oxy aluminum acylate interreacts with the other components of the resin composition. Such compositions can be prepared easily and simply, and, in the presence of a curing agent, can be converted into solid products which characteristically have physical properties and chemical resistance which are, respectively, at least as good as comparable cured compositions which contain no oxy aluminum acylate.

17 Claims, 2 Drawing Figures

FIG. 2

POLYESTER RESIN COMPOSITION CONTAINING OXY ALUMINUM ACYLATES

BACKGROUND OF THE INVENTION

This invention relates to thickened polyester resins and to techniques for making same.

In the art of making and using polyester resins, it has been generally desirable to produce a curable product comprised of unsaturated polyester resin and vinyl monomer which, for certain applications, is thickened relative to the condition of the polyester resin vinyl monomer composition in its freshly prepared or initial state. Such applications include, for examples, sheet molding compositions, laminating compositions, gel coating compositions, and, in general, compositions useful in polyester application situations, where it is desirable for the resin composition to be thickened prior to being cured. In particular, in the manufacture of sheet molding compositions, it is desirable to have a low viscosity liquid resin system initially so that many additives and compounds can be mixed with it, and then to have controlled thickening of the resin system up to a stage where it can then be molded by conventional sheet molding techniques and finally cured.

Heretofore, the art has taught that aluminum alkoxides and certain related organoaluminum compounds can be employed under certain circumstances in polyester/vinyl monomer systems to increase resin system viscosity and thixotropic characteristics (see, for example, Watanabe et al U.S. Pat. No. 3,361,845; Williger U.S. Pat. No. 3,536,642; Nikki German Auslegeshrift No. 1,164,089; and Asahi British Pat. Specification No. 1,092,528.) In this art, it has been previously theorized that the reaction of the aluminum alkoxides (and other organoaluminum compounds as disclosed in, for example, Bailey U.S. Pat. No. 4,049,748) with the terminal carboxyl and hydroxyl groups of the resin and with water (and perhaps other impurities present in the system) produces by-product alcohol which normally does not escape from the system of resin vinyl monomer and aluminum alkoxide prior to its being cured. The following is illustrative of three of the most likely reactions:

where R' and R" represent resin molecules or hydrocarbon chains as impurities in the resin, R is a hydrocarbyl radical, and HOH represents trace amounts of water left in the resin from the esterification process. As can be seen by this illustration, the complete reaction of a trifunctional aluminum alkoxide produces 3 moles of alcohol (ROH) per mole of aluminum alkoxide as a by-product. In a like manner, a difunctional aluminum alkoxide produces 2 moles of alcohol per mole of aluminum alkoxide, and also a monofunctional aluminum alkoxide produces one mole of of alcohol per mole of aluminum alkoxide when such alkoxide is reacted with the polyester resin.

The presence of this by-product alcohol diminishes the improved chemical resistance effect in cured polyester resin systems generally attributed to aluminum alkoxides.

This alcohol in a polyester resin/vinyl monomer composition is essentially a non-reactive material which behaves as a diluent. Thus, when a curable composition of polyester resin and vinyl monomer which contains, for example, aluminum alkoxide is cured, the inherently produced by-product alcohol remains in the cured resin as a non-reactive diluent. Depending on the particular resin and aluminum derivative used, such alcohol in effect can be regarded as a hydrophilic agent which operates to reduce cured resin chemical resistance. In general, the presence of such a by-product alcohol has an adverse effect upon cured resin physical properties and chemical resistance.

It would be highly desirable, in order to overcome the problem of the inherent by-product alcohol production achieved through addition of aluminum alkoxide to a starting polyester resin vinyl monomer system, to be able to use instead of such prior art organoaluminum compound, a different organoaluminum compound which accomplishes a desired viscosity change (increase) without producing such a by-product alcohol. Further, it would be desirable to be able to use a different organoaluminum compound which reacts with a polyester resin and causes solely the effect of achieving increased cured resin moisture resistance and this at a concentration level which produces little or no thickening (viscosity increase) in uncured resin composition, all without having such a moisture resistance reducing by-product alcohol produced in such product resin compositions inherently.

My copending application U.S. Ser. No. 917,263 filed June 20, 1978 and now abandoned teaches that, when aluminum alkoxide is employed to thicken polyester resins, the moisture content of the resin must be adjusted to the approximate ratio of one mole of water per mole of aluminum alkoxide to achieve optimum thickening for a given amount of aluminum alkoxide. Since the trace amount of water inherently left in the resin from the esterification process varies from resin to resin, and even from one batch to another of the same resin, it is necessary in most cases to determine for each batch the exact amount of additional moisture needed by a given resin batch. Such above indicated copending application provides a technique for determining how much water is needed in a given batch to achieve maximum thickening with a given quantity of a specific organoaluminum compound of the class taught by Bailey U.S. Pat. No. 4,049,748. It would be highly desirable to be able to use a polyester resin reactive organoaluminum compound other than one of the types described in Bailey U.S. Pat. No. 4,049,748 for thickening a polyester resin/vinyl monomer composition which different compound would obviate the need for employing such water add technique. Eliminating the requirement for water adding would result in predicability and simplicity in polyester resin thickening using organoaluminum materials.

Organoaluminum compounds where a carbon atom of the organic moiety is connected to the aluminum atom through an oxygen linkage generally appear to be desirable for use in polyester/vinyl monomer systems except for these two deficiencies (by-product alcohol production and moisture determination steps) because such organoaluminum compounds generally have the useful characteristic of reactability with carboxyl groups and hydroxyl groups which groups are both commonly found as chain terminating moieties in polyester resins. Also, such organoaluminum compounds tend to be compatible with polyester resins without causing excessively adverse side reactions, storage problems, or the like. Further, such organoaluminum compounds are readily soluble both in the unsaturated polyester resins, as well as in the vinyl monomers characteristically employed therewith, in commerical polyester compositions.

The class of organoaluminum compounds known as aluminum acylates has previously been employed in alkyd gels to provide thixotropic paints or dripless paints (see Rinse U.S. Pat. No. 2,892,780). Although Example 6 of this patent uses the word polyester, it is obvious to those skilled in the art that this composition is in fact a coating resin which is clearly not the same type of polyester resin that is employed in molding applications.

In addition, if this coating polyester resin were to be dissolved in styrene as such Example 6 suggests, it would still produce a byproduct alcohol (isopropyl alcohol) which would be derived from the isopropyl radical in the hydroxyl isopropoxy aluminum stearate, and this byproduct alcohol would remain in the product resin as a nonreactive diluent, where it would interfere with physical properties and chemical resistance in a molded and cured product.

Rinse never appreciated that, or attached any significance to, the production of a byproduct alcohol as a result of organoaluminum compound addition to his alkyd gels. For one thing, the presence of a byproduct aluminum in an alkyd resin is of no particular detrimental effect upon such product material or compositions, e.g. paint compositions made thereof, for the reason that, once the coating is applied to a substrate as a layer and dried, the drying process permits a simple and effective means for removing the alcohol from such a layer or coating without producing a coating which has a structural weakness caused by the presence of the original alcohol during the curing thereof. In molding resins of the polyester type, however, a different situation prevails. Here it is not possible to effectuate the removal of the byproduct alcohol during curing to an extent sufficient to avoid a structural weakening of the final cured product compared to the same product in its cured state as it would exist without any of the byproduct alcohol being present therein.

For another thing, although Rinse in such U.S. Pat. No. 2,892,780 includes the possibility of aluminum acylate compounds of the form:

wherein R is an organic moiety as defined by Rinse in such patent, Rinse nevertheless provides no teachings or exemplary information which would enable one skilled in the art to use such compounds in alkyd gels of the particular type disclosed by Rinse. The only example using aluminum acylates of this form is example 5 where an oxyaluminum stearate is added to an alkyd resin which in turn is added to a lubricating; oil to form a grease.

Moreover, there are no teachings in Rinse with regard to the properties of an alkyd resin made with such a structure as shown above (see formulas with the exception of the one used to make lubricating grease. In other words, Rinse never made either an alkyd coating resin or a polyester resin which had been treated with an organoaluminum compound of the class employed in the present invention (as hereinafter explained) which would inherently contain no alcohol byproduct resulting from a reaction of organoaluminum compound with polyester resin.

Rinse only discusses the thixotropic character of alkyd resins treated with the organoaluminum compounds identified by him (see column 1, lines 41 through 50 wherein the Rinse organoaluminum compounds are defined). In the case of unsaturated polyester molding resins, the control of viscosity and the achievement of a viscosity increase in a resin composition which contains vinyl monomer compared to the viscosity of a starting or freshly made such resin composition has substantial significance in terms of the ability of a resin composition user to employ that resin composition in various conventional end use applications, including spraying, lay-ups, sheet forming, and the like. In contrast, typically in the field of alkyd resins, such a relatively minor increase in viscosity is not as important as is the need to control thixotropic behavior. The thixotropic behavior of alkyds cannot properly be compared to, and is not equivalent to, the viscosity behavior in a polyester resin/vinyl monomer composition which has been treated with aluminum acylates utilized in the practice of the present invention.

BRIEF SUMMARY OF THE INVENTION

The present invention relates to an organoaluminum modified curable storage stable polyester resin/vinyl monomer composition which incorporates thereinto an oxy aluminum acylate material of low to intermediate molecular weight, variations in molecular weight being achieved primarily by variations in the chain lengths of the respective hydrocarbon radicals incorporated thereinto. The composition has improved properties compared to prior art organoaluminum modified curable polyester resin/vinyl monomer compositions.

A composition of this invention characterized by an ability to demonstrate increased viscosity relative to corresponding non-aluminum modified curable storage stable polyester composition. No water is needed either by way of addition or by being inherently deliberately contained in a given starting polyester resin composition in order to produce a viscosity increase or to achieve a maximum increase in viscosity for a given amount of oxy aluminum acylate compound added thereinto.

Furthermore, a composition of this invention containing oxy aluminum acylate additive and the polyester resin components which is advantageous in permitting a cured product composition of the present invention to maintain physical properties and chemical resistance substantially equivalent to those of a corresponding nonaluminum containing cured polyester resin composition. In fact, in some instances (though present data does not permit a firm conclusion in this regard), it appears that some of the cured aluminum containing polyester resin product compositions of this invention actually have improved physical properties or chemical resistance compared to corresponding untreated (nonaluminum containing) cured polyester resin compositions of the prior art.

Curable product compositions of this invention can be prepared which are thickened little or even not at all compared to a starting polyester resin/vinyl monomer composition containing no oxy aluminum acylate but which nevertheless when cured display improved physical properties and chemical resistance over corresponding cured products derived from compositions containing no oxy aluminum acylate.

The present invention includes methods for making and using the curable product compositions and the present invention includes cured products prepared from curable product compositions.

Other and further objects, aims, purposes, features advantages, utilities and the like will be apparent to those skilled in the art from the accompanying teachings.

DETAILED DESCRIPTION

More specifically, the polyester resin compositions of this invention are single phase homogeneous systems comprised of polyester resin, vinyl monomer, and certain oxy aluminum acylates. The latter are characterized by having either the formula:

(1)

or the formula:

(2)

where R is in any given occurrence a hydrocarbon radical containing from 3 to 12 carbon atoms. As those skilled in the art will appreciate in formula (2) each R on the ring can, if desired, contain a different number of each carbon atoms.

Such a composition after preparation when heated under controlled conditions can develop a greater viscosity if sufficient oxy aluminum acylate is present; yet, after heating and cooling such composition remain curable and is found to have excellent storage stability characteristics. Some such heated and cooled products display thixotropic properties after experiencing a viscosity increase. Most especially, the heated and cooled compositions of this invention are characterized by being substantially completely free of alcohol of the type inherently produced for example, by aluminum alkoxide addition to polyester resin systems of the prior art as described above. Consequently, a curable resin composition of the present invention does not contain any free alcohol diluent which if present would detract from moisture resistance in a cured product prepared therefrom.

In addition, it has been found that the compositions of this invention do not require any adjustment of their moisture contents, such as as to achieve an approximate ratio of one mole of water to one mole of organoaluminum compound in order to achieve optimum thickening for a given amount of organoaluminum compound. Although, it may be that a very small and presently unknown catalytic quantity of moisture is needed to catalyze or to initiate the desired reaction between resin and oxy aluminum acylate, the need for such water has not yet been established or proven, and, even if necessary, the small amount necessary is almost always present in polyester resins of water because as a trace amount of water is characteristically present in a polyester resin vinyl monomer system owing to the polyester esterification manufacturing process.

It has been heretofore theorized that thickening is caused by the coordination of —OH groups which are chemically bound to the aluminum atom. In the previous art of using aluminum alkoxides, it was necessary to add these —OH groups into a resin system by adding moisture (water) to the resin system for maximum thickening, as indicated above. In the present invention, the Al-OH group is now theorized to be supplied in stoichiometric quantity by the reaction of the oxy aluminum acylate with the carboxyl and/or hydroxyl groups present in the resin according to the following examplary equations (but there is not intent herein to be bound by theory).

(3)

(4)

where R is a hydrocarbon radical and R′ represents a resin molecule (polyester resin molecules are characteristically terminated by both hydroxyl and carboxyl groups) or even a hydrocarbon chain which happens to be present in the resin system as an impurity.

Water is not needed to achieve the above indicated results in compositions of this invention but the exact reasons why, cannot yet be stated with certainty. If one does add water to a curable liquid composition of this invention, not only are not beneficial results obtained, but also such a composition can exhibit a definite deterioration in properties, such as a lower peak viscosity compared with a resin to which no water has been added. The addition of water to an oxyaluminum acylate tends to diminish its viscosity producing capability by the addition of 2 —OH groups on the aluminum atom. It is believed that one —OH group attached to the aluminum atom provides the optimum viscosity increase and more than one produces less viscosity increase.

In general, polyester resin composition of this invention are modified with an oxy aluminum acylate as described above and are either in a liquid condition or in a formable solid condition. Both conditions or states can be converted into cured (cross-linked) solid conditions or states as by molding or the like. When cured such a polyester resin compostion exhibits substantially no decrease in (a) physical properties and (b) chemical resistance as a result of the oxy aluminum acylate being present. In the present context, by the term "physical properties" reference is had to such following properties as flexural strength and flexural modulus.

In the body of the specification, as used herein the term "chemical resistance" has reference to the retention of the flexural strength properties after a 48 hrs boil of the cured resin in distilled water.

Characteristically, a polyester resin composition of this invention having characteristics as here and above indicated contains from about 20 to 90 weight percent of an unsaturated polyester resin, from about 0.1 to 20 weight percent of at least one oxy aluminum acylate as here and above described, from about 50 to about 1000 parts per million (ppm) of at least one inhibitor, and from about 10 to 80 weight percent of a liquid comprising at least one vinyl monomer.

The unsaturated polyester resins employed in the practice of the present invention have a molecular weight range extending from about 1,000 to 30,000 (as determined, for example, by gel permiation chromatography, or the like). Such unsaturated polyester resins are comprised of a condensate of at least one polyol with a mixture of at least one saturated polycarboxylated compound and at least one unsaturated polycarboxylated compound. Starting material and condensation conditions employed in the manufacture of such unsaturated polyester resins are well known to the prior art (see, for example, "Polyester Resins" by John R. Lawrence, published by Van Nostrand, Reinhold Company, 1960, "Polyester Resins and Their Applications" by Bjorksten Research Laboratories, Inc., Reinhold Publishing Corporation, 1956, and the like).

One preferred class of unsaturated polyester resins for use in the present invention is a condensate of a mixture which initially comprises on a 100 weight percent total weight basis (A) from about 20 to 65 weight percent of at least one first carboxylic acid material selected from the group consisting of aromatic dicarboxylic acids and anhydrides thereof, such first carboxylic acid material having its carboxylic group carbon atoms each directly bonded to a ring carbon atom, and further having from 8 through 12 carbon atoms per molecule, (B) from about 10 to 50 weight percent of at least one second carboxylic acid material selected from the group consisting of ethylenically unsaturated aliphatic dicarboxylic acids and anhydrides thereof, said second carboxylic acid material having from 4 through 7 carbon atoms per molecule, and (C) from about 40 to 60 weight percent of at least one saturated glycol containing from 2 through 7 carbon atoms per molecule.

The respective quantity of component (c) relative to components (a) and (b) is such that the resulting condensate can comprise (and preferably does comprise) a substantially completely non-volatile resin. For purposes of this invention, the volatility (or non-volatiity) of a polyester resin can be determined by Federal Specification Test Procedure No. TTP-14 lb, Method 404.2.

Another preferred class of unsaturated polyester resin for use in the present invention comprises on a 100 weight percent total unsaturated polycarboxylated compound basis from about 5 to 100 weight percent calculated isophthalic acid equivalent, said polyester resin further containing on a 100 weight percent total resin basis at least about 2.5 weight percent calculated isophthalic acid equivalent.

Another preferred class of unsaturated polyester resin for use in the present invention comprises a 100 weight percent total weight basis:

from about 40 to 60 mole percent of at least one carboxylic acid material selected from the group consisting ethylenically unsaturated aliphatic dicarboxylic acids and anhydrides thereof each having from 4 through 7 carbon atoms per molecule, and from about 60 to 40 mole percent of at least one saturated glycol containing from 2 through 7 carbon atoms per molecule. Examples of more preferred such polyester resins are condensate of maleic anhydride (or maleic acid) with propylene glycol. Such a polyester resin can additionally contain minor amounts of other glycols and other dicarboxylic acid materials as those skilled in the art will understand.

Example of suitable carboxylic acid materials and suitable glycols appear in the aforementioned Bailey U.S. Pat. No. 4,049,748.

Preferred oxy aluminum acylates for use in the practice of this invention are the products from formula 1 and 2 where R can range from 6 to 10 carbon atoms inclusive with R being aromatic or aliphatic in structure. Examples of suitable oxy aluminum acylates for use in the present invention includes: oxy aluminum octoate, oxy aluminum hexoate, oxy aluminum decoate, oxy aluminum pelargonate and the like.

Vinyl monomers useful in the practice of this invention are characterized by having molecular weights ranging from about 100 to 250 (and preferably from about 104 to 118), the larger and smaller molecular weight monomers can be employed. Preferably a vinyl monomer liquid has a boiling point greater than about 100° C. and preferably in the range from about 145° to 170° C. Examples of suitable vinyl monomers include styrene, methyl methacrylate, vinyl toluene, alpha-methyl styrene, vivinyl benzene, dichlorostyrene, diallyphthalate, triallyl cyanurate, and the like. Styrene, vinyl toluene, and methyl methacrylate are presently preferred.

In the preferred practice of this invention, an inhibitor is dissolved in a starting liquid vinyl monomer system which aides in preventing any undesirable or excessive polymerization or gelation of a product solution of unsaturated polyester resin in vinyl monomer liquid. Any convenient or conventional inhibitor among those known to the prior art may be used. Examples of presently preferred suitable inhibitors include hydroquinone, methohydroquinone, and t-butyl catechol Thus, a solution of unsaturated polyester resin in vinyl monomer is preferably inhibited with such a dissolved inhibitor. Conveniently and typically, the amount of inhibitor is in the range above indicated, with the preferred amount of inhibitor being used typically ranging from about 100 to 200 ppm.

Preferred polyester resin compositions of this invention contain from about 50 to 70 weight percent unsaturated polyester resin, from about 0.5 to 5 weight percent of at least 1 oxy aluminum acylate, from about 100 to 200 ppm of at least 1 inhibitor, and from about 20 to 70 weight percent of a liquid vinyl monomer, all as here in above indicated.

Any convenient method of preparation may be employed to prepare polyester resin compositions of the present invention. One preferred preparation procedure is to make a premix of at least 1 oxy aluminum acylate dissolved in a liquid vinyl monomer system. Conveniently the dissolution of oxy aluminum acylate in vinyl monomer is accomplished at temperatures which can range from ambient to about 100° C. Such a premix solution is preferably in a substantially anhydrous storage stable condition.

Such a premix can then be employed as an additive to a previously but separately prepared composition comprising a solution of unsaturated polyester resin in vinyl monomer liquid. Methods for the preparation of such solutions are well known to those skilled in the art. A premix solution of oxy aluminum acylate in vinyl monomer can be added to such a solution of unsaturated polyester resin in vinyl monomer with agitation at a temperature ranging from ambient up to about 100° C.

After oxy aluminum acylate has been dissolved together with polyester resin and vinyl monomer (with inhibitor), it is possible for the oxy aluminum acylate to slowly react with the polyester resin in the system. Since such a reaction at ambient temperatures appears to require an indefinitely long period of time, it is preferred in accordance with the practice of the present invention to warm a composition of unsaturated polyester resin, oxy aluminum acylate, inhibitor, and vinyl monomer to a temperature in the range from about 40° to 60° C. for a time of from about 30 to 3 hours in order to hasten the inner reaction of the oxy aluminum acylate with the polyester resin in the composition. When the amount of oxy aluminum acylate present is sufficient, a thickening of the system occurs during heating.

For example in practice samples of the resin to be treated are mixed with several levels of oxy aluminum acylate and subjected to elevated temperatures for several hrs. The viscosity is measured after cooling and a level is chosen that will give the required viscosity.

By using small amounts of oxy aluminum acylate, it is possible to minimize or even substantially completely prevent thickening during the heating cycle above described yet at the same time a reaction between the oxy aluminum acylate and the polyester resin does occur, it is believed, since after the product has been so heated and cooled, and then subsequently cured an increase in physical properties and chemical resistance is observed.

In general, the amount of oxy aluminum acylate added does not need to be an amount which is sufficient to produce a viscosity increase by the heating technique as hereinabove described because moisture resistance and weather resistance as well as physical strength characteristics in a cured product resin can be improved by adding an amount of oxy aluminum acylate to a liquid polyester resin system below that amount needed to obtain a viscosity increase. The exact amount of oxy aluminum acylate needed to effect an increase in moisture resistance, weather resistance, or physical strength properties in any given instance is, so far as can be presently determined, variable from one resin to another so that it is not possible at this time to make generalizations as to the amount of resin which used under the circumstances for addition to all polyester resin compositions.

If desired, an oxy aluminum acylate material can be directly added to a preformed solution of unsaturated polyester resin in vinyl monomer without first preliminarly dissolving the oxy aluminum acylate in vinyl monomer.

The amount of oxy aluminum acylate added to a solution of unsaturated polyester resin in vinyl monomer can be such that the viscosity is increased to an extent sufficient to raise the viscosity of the starting liquid system to that of a formable solid. The amount of oxy aluminum acylate which needs to be added to a given polyester resin composition in order to produce a formable solid is variable from one unsaturated polyester resin system to another, or from one vinyl monomer system to another, so that no precise definitions are possible so far as an advanced determination of final viscosity is concerned. However, typically the point at which the resin becomes a formable solid appears to fall in the range of from about 1 to 3 weight percent of oxy aluminum acylate based upon a 100 weight percent total aluminum modified curable storage stable polyester resin composition.

Typically and characteristically, high molecular weight resins with low acid numbers tend to require less oxy aluminum acrylate to produce a given viscosity and could even be below one percent.

Polyester resin compositions of this invention require an initiator in order to effect curing. As used herein the term "initiator" has reference to a substance which when added to a polymerizable resin composition of this invention appears to promote addition polymerization.

Preferred initiators in the present invention are peroxides from the following groups: di acyl peroxides, such as di benzoyl peroxide; di lauroyl peroxide; di(2,4-di chloro benzoy)peroxide, sulfonyl peroxides, mono peroxycarbonates, peroxy di carbonates. Peroxy esters such as tertiary butyl perbenzoate; tert. butyl peracetate; di tertiary butyl di peroxy azelate; and the like. Di peroxyketals such as ethyl 3.3 di(t-butyl-peroxy)butyrate; 1.1-di(t-butyl peroxy)-cyclohexane and the like. Di alkyl peroxides such as 2.5-di(t-dutylperoxy)-2.5-dimethyl hexane; di cumyl peroxide and the like. Hydroperoxides such as t-butyl hydroperoxide and the like. Ketone peroxides such as methyl ethyl ketone peroxide and the like. Other preferred initiators are the commercial AZO initiators such as the symmetrical azonitrile commonly known as ABVN and the unsymetrical azonitrile tradenamed LAUZO-70 and the like.

In the case of formable solid products of the present invention, the initiator should be dissolved in the polyester resin composition of this invention before the same is converted into a formable solid state plus the inhibitor may be present in a starting unsaturated polyester resin composition at the time when an oxy aluminum acrylate (or mixture thereof) is added to an unsaturated polyester resin composition in accordance with the practice of the present invention.

One primary consideration in selecting an initiator, or initiator system (mixture) for curing a polyester resin composition of this invention is generally the temperature at which the curing process is to be carried out. As is conventional in the curing of polyester resins generally, after an initiator has been added to a resin system, the curing process starts as soon as the initiator breaks down into active free radicals. Such a breakdown is accomplished by heating a system of this invention to a temperature at which the particular initiator (or initiator mixture) employed decomposes at a fairly rapid rate. Alternatively, decomposition of initiator can be accomplished at lower temperatures by the use of accelerators and/or promotors which serve to decompose the initiator in any given instance to free radicals about as rapidly as in normal thermodecomposition.

Unless the inhibitor present in a starting liquid resin composition of this invention at the time of curing decomposes with increasing temperature, the initial free radicals characteristically are initially consumed by reacting with the inhibitor. In addition to regulating storage stability of a liquid resin composition of this invention, an inhibitor may be used to lengthen the liquid state time so as to permit a limited number or control additional flow of a resin composition of this invention after lay-up or the like before a given composition gels. Preferably, in product compositions of this invention, the concentration and type of inhibitor are such that the inhibitor is fairly rapidly consumed by approximately an equivalent portion of initiator.

Polyester resin compositions which contain an oxy aluminum acylate and which have been subjected to a heat treatment in accordance with the teachings of this invention can be subsequently cured by the curing procedures normally and customarily employed in the art of polyester resins.

As used herein, the term "inhibitor" has reference to a substance which when added to a polymerizable resin composition of this invention appears to provide storage stability therefore.

In general for purposes of the present invention, "promoters" and "accelerators" are compounds which speed the decomposition of an initiator material into free radicals at room temperatures or at temperatures considerably below characteristically required to release free radicals when an initiator alone is used. A promoter promotes cross-linking at ambient temperatures (thereby tending to avoid the use of applied heat to affectuate a resin cure). Promoter examples include: cobalt carboxylates, manganese carboxylates and the like. An accelerator, on the other hand, is a substance which when added to a polymerizable resin composition of this invention tends to shorten curing time at given curing conditions (optional for ambient cure). Examples of preferred accelerators include dimethyl aniline, diethylaniline and the like.

In commercial practice the terms "promoter" and "accelerator" are sometimes used interchangably. Accelerators sometimes are called "secondary promoters" and it is common to use several products from both categories which are generally referred to as "promoter systems". The intent here is to not limit the technology of this invention to any one nomenclature. Examples of other products which can be present in promotor systems when practicing this invention are: N.N-Dimethylacetoacetamide, ethyl acetoacetate, methyl acetoacetate, mono-n-methylacetoacetamide, acetoacetanilide, m-tolyldiethanolamine, phenyldiethanolamine, quaternary nitrogen products and the like.

In one preferred mode of curing a liquid resin composition of this invention, there is added to such a composition and mixed therewith a curing composition immediately prior to the time when curing of such a composition is to be effected. Such curing composition one comprise: for example, methyl ethyl ketone peroxide.

In one preferred mode of curing a formable (curable) solid resin composition of this invention (that is one that already contains an initiator system therein, the gelled solid is formed preliminarily into a convenient shape such as sheet product. Suitable sheets have thicknesses typically ranging from about 0.005 to 1.5 inches. Sheets can be made by conventional sheet forming techniques well known to those familiar with the polyester resin art. A sheet product is conveniently formed by conforming same between the surface defining the cavity of a matched metal dye. Thereafter the resulting so conformed sheet is heated for a time and at a temperature sufficient to cure the sheet as so formed.

In general, polyester resin compositions of this invention are used similarly to polyester resin compositions known to the prior art. Glass fibers (e.g., roving or premixed chopped glass) and glass cloth can be used for reinforcement using the teachings of the prior art, for example, in addition to conventional reinforcing agents known to the prior art. Resins of this invention can be compounded with extenders, plasticizers, flame retardants, coloring pigments, thixotropic agents, and the like. In addition to glass fibers (some bonding may occur between such glass fibers and resins of this invention), one may use, for instance, fibers of sisal, asbestos, wood, metals, or the like. Pigment fillers include inorganic, metalic, and organic systems. For example see, for glass filled resins, ASTM C-581, paragraph 5.1.2.1.

EMBODIMENTS

The present invention is further illustrated by reference to the following examples. Those skilled in the art will appreciate that other and further embodiments are obvious and within the spirit and scope of this invention from the teachings of these present examples taken with the accompanying specifications.

The following examples illustrate preparation of polyester resins useful in the practice of the present invention.

EXAMPLE A

A polyester resin solution commercially available from U.S. Steel Corporation, Polyester Division Linden, New Jersey under the trademark GR 941 with the typical properties listed below:
 Styrene monomer content: 35 wt. %
 Polyester resin content: 65 wt. %
 Viscosity as is: 838 cps. at 25° C.(Brookfield at 6 rpm)
 Viscosity diluted to 56 wt. % with styrene: 178 at 25° C.(Brookfield) at 6 rpm)
 Description: Non-promoted orthophthalic base resin.

EXAMPLE B

A polyester resin solution commercially available from Interplastics Corporation under its trademark "Corezyn 101" having the typical properties listed below:
 Styrene content: 35 wt. %
 Polyester resin content: 65 wt. %
 Gel time (SPI procedure): 4.5–5.5 min.
 Cure time (SPI procedure): 7.0–8.0 min.

EXAMPLE C 816.8 g aluminum isopropylate is placed in a 4 liter reaction kettle. 1153.6 g of 2, ethyl hexanoic acid is subsequently introduced through a dropping funnel and the temperature raised to 110° C. at which time isopropanol starts to distill off. The temperature slowly is raised to 160° C. by which point two moles of alcohol are distilled off. the temperature is then raised past 200°

C. where isopropyl octoate starts to reflux. After refluxing for 1 hour, initial amounts of isopropyl octoate are taken off. Isopropyl octoate is continually taken off until a residue of 975 grams left. The residue is a 76.3% soln. of oxy aluminum octoate in isopropyl octoate.

EXAMPLE D

Approximately 100 grams resin from Example B is placed in a beaker and the following chemicals added thereto: one gram benzoyl peroxide and six grams of a 50% styrene solution of the oxy aluminum acylate from example C. This mixture is mixed thoroughly at ambient temperatures until all ingredients are dissolved into a clear solution. Said solution is then poured onto 2 sheets (approximately 5"×5") of glass cloth which are placed in a shallow flat glass dish. Such dish had previously been treated with a release agent to facilitate removal at a late date. The resin penetrates the glass cloth and flows evenly into it leaving no air voids. The glass dish is then placed in an oven whose temperature is maintained at 40° C. continuously to activate the aluminum compound the 40° C. temperature being not high enough to initiate the curing mechanism of the system. The glass cloth-resin mixture is allowed to remain in the oven for a total of 4 days and observations are made each day to determine its physical state:

TABLE A

| | |
|---|---|
| After 1 24 hour day: | Dry to touch and spatula dented surface of mixture |
| After 2 24 hour days: | Dry to touch. Previous day's dent dissappeared, but new dent made with a spatula. |
| After 3 24 hour days: | Dry to touch. Previous day's dent dissappeared, but new dent made. |
| After 4 24 hour days: | Dry to touch. Previous day's dent dissappeared, but new dent made with a spatula. |

After the 4 days observation, this non-tacky, formable sheet is cured in an oven at 80° C. for 3 hours which produced a rigid laminate with a Barcol hardness of 52.

This sheet product before curing is suitable for matched metal die processing.

EXAMPLE E

Approximately 1613 grams of the resin from Example A is placed in a 3 liter reaction flask and the following chemicals added thereto: 50 parts per million tertiary butyl catechol, 275 grams styrene monomer and 32 grams oxy aluminum octoate from Example C. After mixing for about 5 minutes the product mixture is divided into three portions each approximately equal to the other.

Thereafter each portion of the resin is further diluted with a styrene solution of a like resin which is composed of 56 weight percent of a non volatile resin to produce fractions as follows:

Fraction A—No dilution with resin/monomer solution

Fraction B—10% dilution with resin/monomer solution

Fraction C—20% dilution with resin/monomer solution

Thus the amount of the oxy aluminum octoate product is reduced in each of the above described portions, so that the weight percent in each fraction is:

A=1.7% oxy aluminum octoate
B=1.55% oxy aluminum octoate
C=1.42% oxy aluminum octoate from each fraction so prepared three subfractions are separated, and then to each subfraction water is added as follows:

Subfraction 1: No water
Subfraction 2: One drop water (0.02 weight % of total subfraction)
Subfraction 3: Two drops water (0.04 weight % of total subfraction)

All subfractions are shaken to dissolve the water, and then all subfractions are placed in a 60° C. oven and held for 5 hours. Viscosities (Brookfield at 25° C. measured at 6 rpm) are measured the next day and are found to be as follows:

TABLE B

| water added, % by weight total composition basis | FRACTION | | |
|---|---|---|---|
| | A | B | C |
| Subfraction 1 (No water added) | off scale | 1980 | 980 |
| Subfraction 2 (0.02 water added) | off scale (less viscos) | 1380 | 780 |
| Subfraction 3 (0.4 water added) | 4480 cps | 980 | 630 |

Figure 1:
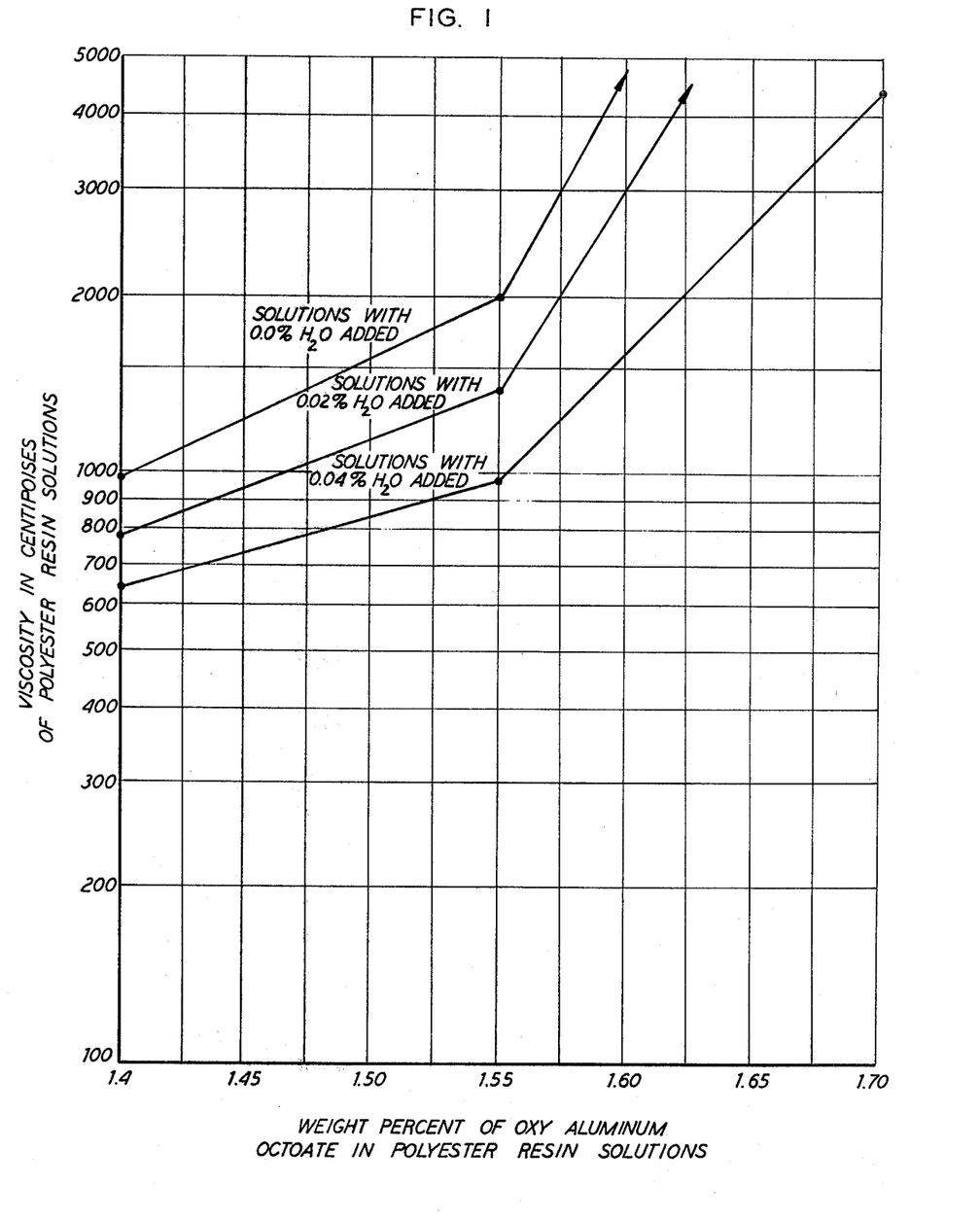
FIG. 1 provides a graphical presentation of the changes in viscosity produced in a given polyester liquid resin composition when increasing amounts of aluminum alkoxides of the type known to this prior art (here oxy aluminum octoate) are introduced into different samples of such resin compositions in the presence of controlled amounts of added water.

The results are plotted to produce the curves shown in FIG. 1 wherein the weight percentages of oxy aluminum acrylates are plotted as absciessae and the viscosities in centipoises are plotted as ordinates. It is evident from the curves of this FIGURE that water added to the polyester does not produce an increase in viscosity, and only tends to lower viscosity. The next example shows the response of the same resin with a typical aluminum alkoxide for comparison.

EXAMPLE F

Approximately 2064 grams of the resin from Example A is placed in a 3 liter reaction flask and the following chemicals added thereto: 50 parts per million tertiary butyl catechol, 336 grams styrene monomer and 36 grams aluminum tri-secondary butoxide. After mixing for about 5 minutes the product mixture is divided into five portions each approximately equal to the other.

Thereafter each portion of the resin is further diluted with a styrene solution of a like resin which is composed of 56 weight percent of a non-volatile resin to produce fractions as follows:

Fraction A—No dilution with resin/monomer solution

Fraction B—5% dilution with resin/monomer solution

Fraction C—10% dilution with resin/monomer solution

Fraction D—15% dilution with resin/monomer solution

Fraction E—20% dilution with resin/monomer solution

Thus the amount of the aluminum tri-secondary butoxide product is reduced in each of the above described portions, so that the weight percent in each fraction is:

A=1.50% aluminum tri-secondary butoxide
B=1.42% aluminum tri-secondary butoxide
C=1.36% aluminum tri-secondary butoxide
D=1.30% aluminum tri-secondary butoxide
E=1.25% aluminum tri-secondary butoxide From each fraction so prepared three subfractions are separated and then to each subfraction water is added as follows:

Subfraction 1=no water
Subfraction 2=one drop water (0.02 weight percent of total subfraction)
Subfraction 3=two drops water (0.04 weight percent of total subfraction)

All subfractions are shaken to dissolve the water and then all placed in a 60° C. oven and held for 5 hours. Viscosities (Brookfield at 25° C. measured at 6 rpm) are measured the next day and are found to be as follows:

TABLE C

| | water added, weight percent total composition basis | FRACTION | | | | |
|---|---|---|---|---|---|---|
| | | A | B | C | D | E |
| Subfraction 1 | (No water added) | 430 cps. | 430 cps. | 380 cps. | 430 cps. | 430 cps. |
| Subfraction 2 | (0.02% water added) | 680 cps. | 680 cps. | 680 cps. | 480 cps. | 480 cps. |
| Subfraction 3 | (0.04% water added) | off scale | off scale | 6630 cps. | 1380 cps. | 1380 cps. |

Figure 2:
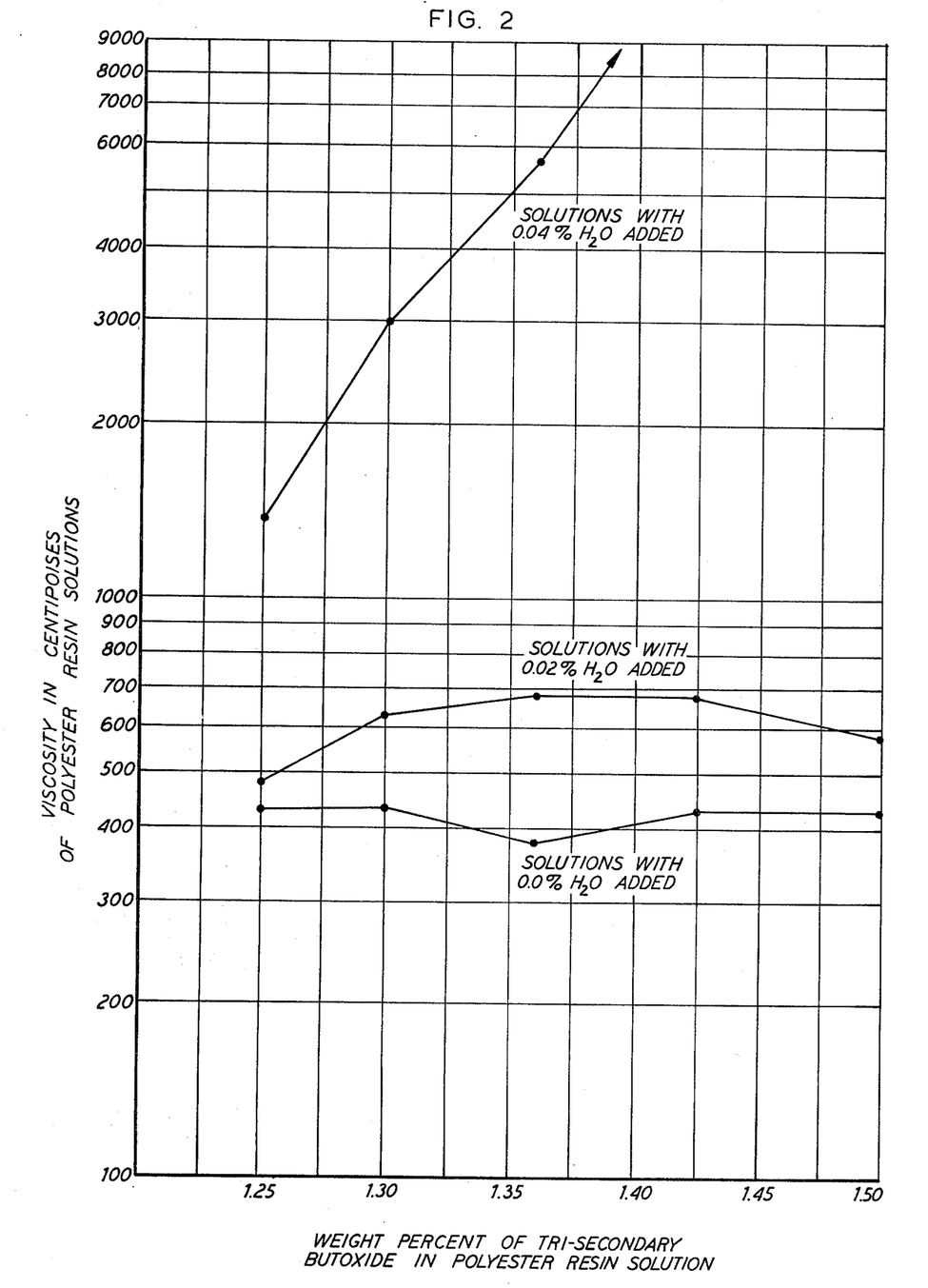
FIG. 2 provides a graphical presentation of the changes in viscosity produced in a given polyester liquid resin composition when increasing amounts of aluminum alkoxides of the type known to the prior art (here aluminum tri secondary butoxide) are introduced into different samples of such resin composition in the presence of controlled amounts of added water.

The results are plotted to produce the curves shown in FIG. 2 wherein the weight percentages of aluminum alkoxide compounds are plotted as abscissae and viscosities in centipoises are plotted ordinates. It is evident from the curves of this FIG. 2 that the use of an aluminum alkoxide requires the addition of at least about 0.04% water in order to achieve an optimum viscosity increase in this particular resin. The step needed to find out how much water needs to be added is eliminated when an oxy aluminum acylate is used in place of an aluminum alkoxide (see, for instance, Example E).

EXAMPLE G

Three samples of the resin employed in Example B are prepared as follows:

Sample I

To 100 grams of the resin from Example B is added 2.6 grams of a 50% styrene solution of secondary butyl alcohol, said sample so treated comprising a polyester resin/styrene solution containing 1.3% secondary butyl alcohol.

Sample II

To 100 grams of the resin from Example B is added 3 grams of a 50% styrene solution of aluminum tri-secondary butoxide, said sample so treated comprising a polyester resin/styrene solution containing 1.5% by wt. aluminum tri-secondary butoxide.

Sample III

To 100 grams of the resin from Example B is added 3 grams of a 50% styrene solution of the oxy aluminum octoate from Example C said sample so treated comprising a polyester resin/styrene solution containing 1.5% by wt. oxy aluminum octoate.

All three samples were submitted for gas chromatographic analysis. The gas chromatographic conditions are as follows:

Instrument: Nikro-Tex Model 220, equipped with thermal conductivity detector.
Column: 20% Carbowax 20M on Chromosorb W - in 3 ft. glass
Column temp.: 125° C.
Inlet temp.: 195° C.
Detector temp.: 275° C.
Carrier gas: He Because the resin samples are too viscous for direct injection into the chromatographs ethyl benzene is selected as a solvent and used at a ratio of equal parts by weight with the resin samples. From synthetic mixtures used as a control, the following elution times are observed:

Secondary butanol . . . 0.86 minutes
ethyl benzene . . . 1.25 minutes
styrene . . . 2.4 minutes the results of the analysis are as follows:

Sample I

Sample I (to which 1.3% secondary butyl alcohol is added) shows a gas chromatograph peak corresponding to the gas chromatograph peak for secondary butyl alcohol in synthetic mixtures with ethyl benzene, plus a styrene gas chromatograph peak.

Sample II

Sample II (to which 1.5% aluminum secondary butoxide is added) shows a gas chromatograph peak exactly coinciding with the gas chromatograph peak for secondary butanol which is obtained when testing Sample I and is about the same height as that for Sample I. Quantatative reading of the data shows the amount of secondary butyl alocohol to be 1.22%.

Sample III

Sample III (to which 1.5% by wt. oxy aluminum octoate is added) shows only ethyl benzene and styrene gas chromatograph peaks.

From these Samples I, II, and III as tested above, it is concluded that addition of an aluminum alkoxide to a liquid polyester curable resin solution of the prior art teachings produces a by-product alcohol which can be measured by gas chromatograph whereas the addition of an oxy aluminum acylate of the present invention to such a liquid polyester curable resin solution produces no alcohol nor any other by-product which can be detected by gas chromatography.

I claim:

1. An aluminum modified, curable storage stable polyester resin composition which, when cured, exhibits substantially no decrease in (a) physical properties and (b) chemical resistance as a result of aluminum being present which composition comprises on a 100 weight percent bases:
   (A) from about 20 to 90 weight percent of an unsaturated polyester resin having a molecular weight ranging from about 1,000 to 30,000 and comprised of a condensate of at least one polyol with a mixture of at least one saturated polycarboxylated compound and at least one unsaturated polycarboxylated compounds,
   (B) from about 0.1 to 20 weight percent of at least one oxy aluminum acylate having either one of the following formulas:

-continued where R is in any given occurence an independently selected hydrocarbon radical selected from the group consisting of aliphatic and aromatic radicals containing from 6 through 10 carbon atoms each, (C) from about 50 to 1000 ppm of at least one inhibitor, and (D) from about 10 to 80 weight percent of a liquid comprising at least one vinyl monomer having a molecular weight ranging from about 100 to 250 and said polyester resin, said oxy aluminum acylate, said inhibitor and said vinyl monomer being dissolved together.

2. A composition of claim 1 where the amount of oxy aluminum acylate is such that said composition remains in a liquid state.

3. A composition of claim 1 to which a latent curing system has been added while said composition is in a liquid state, but wherein the total amount of oxy aluminum acylate dissolved therein is such that said composition is in the physical state of an uncured formable solid.

4. A composition of claim 1 to which a curing system has been added, said composition being in a liquid state.

5. The composition of claim 2 containing a curing system.

6. The composition of claim 3 wherein said composition is in the physical form of a sheet suitable for use as a sheet molding compound in a matched metal die molding process.

7. The composition of claim 1 wherein said aliphatic radical when present is an alkyl radical.

8. A composition of claim 1 wherein, in said unsaturated polyester resin, said saturated polycarboxylated compound includes on a 100 weight percent total saturated polycarboxylated compound basis from about 5 to 100 weight percent calculated isophthalic acid equivalent, and said polyester resin contains on a 100 weight percent total resin bases at least about 2.5 weight percent calculated isophthalic acid equivalent.

9. The polyester resin composition of claim 1 wherein said unsaturated polyester resin is a condensate of a mixture which initially comprises on a 100 weight percent total weight basis:

(A) from about 20 to 65 weight percent of at least one first carboxylic acid material selected from the group consisting of aromatic dicarboxylic acids and anhydrides thereof, such first carboxylic acid material having its carboxylic group carbon atoms each directly bonded to a ring carbon atom, and further having from 8 through 12 carbon atoms per molecule, (B) from about 10 to 50 weight percent of at least one second carboxylic acid material selected from the group consisiting of ethylencially unsaturated aliphatic dicarboxylic acids and anhydrides thereof, said second carboxylic acid material having from 4 through 7 carbon atoms per molecule; and (C) from about 40 to 60 weight percent of at least one saturated glycol containing from 2 through 7 carbon atoms per molecule.

10. The polyester resin composition of claim 1 which comprises on a 100 weight percent basis:

(A) from about 50 to 70 weight percent of said unsaturated polyester resin, (B) from about 0.5 to 5 weight percent of said oxy aluminum acylate, (C) from about 100 to 200 ppm of said inhibitor, and (D) from about 20 to 70 weight percent of said vinyl monomer.

11. A process for making a molded, cured article of manufacture from a composition of claim 4 comprising the steps of (A) forming said composition of claim 4 into a predetermined formed body, and (B) heating said so formed body for a time, and at a temperature, at least sufficient to cure said composition of claim 4 comprising said body.

12. A process for making a molded article of manufacture comprising the steps of (A) comforming a sheet product of claim 6 between the surface defining the cavity of a matched metal die, and (B) heating the resulting so conformed sheet for a time and at a temperature sufficient to cure said sheet as so formed.

13. A cured product prepared from the composition of claim 3.

14. A cured product prepared from the composition of claim 4.

15. A cured product prepared from the composition of claim 5.

16. A product produced by the process of claim 11.

17. A product produced by the process of claim 12.

* * * * *